United States Patent
Visvanathan et al.

(10) Patent No.: US 10,248,677 B1
(45) Date of Patent: Apr. 2, 2019

(54) SCALING AN SSD INDEX ON A DEDUPLICATED STORAGE SYSTEM

(71) Applicant: EMC IP Holding Company LLC, Hopkinton, MA (US)

(72) Inventors: Satish Visvanathan, San Jose, CA (US); Mahesh Kamat, Milpitas, CA (US); Rahul B Ugale, Santa Clara, CA (US); Shuang Liang, Sunnyvale, CA (US); Akshay Narayan Muramatti, Sunnyvale, CA (US); Ganesh Karuppur Rajagopalan, San Jose, CA (US); Dheer Moghe, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 431 days.

(21) Appl. No.: 14/586,128

(22) Filed: Dec. 30, 2014

(51) Int. Cl.
G06F 7/00 (2006.01)
G06F 17/30 (2006.01)

(52) U.S. Cl.
CPC ............................... *G06F 17/3033* (2013.01)

(58) Field of Classification Search
CPC ........... G06F 17/3033; G06F 17/30097; G06F 17/30156; G06F 3/0641; G06F 3/0608
USPC ........................................................ 707/474
See application file for complete search history.

(56) References Cited

U.S. PATENT DOCUMENTS

| | | | |
|---|---|---|---|
| 6,067,547 A | 5/2000 | Douceur | |
| 6,427,195 B1 | 7/2002 | McGowen et al. | |
| 7,502,954 B1 | 3/2009 | Strickland | |
| 8,388,987 B2 | 3/2013 | Ikematsu et al. | |
| 8,392,384 B1 * | 3/2013 | Wu | G06F 17/30156 707/693 |
| 8,478,799 B2 | 7/2013 | Beaverson et al. | |
| 8,732,403 B1 | 5/2014 | Nayak | |
| 8,806,115 B1 | 8/2014 | Patel et al. | |
| 8,892,938 B1 | 11/2014 | Sundaram et al. | |
| 9,043,555 B1 | 5/2015 | Khona et al. | |
| 9,116,848 B1 | 8/2015 | Jordan et al. | |
| 9,390,116 B1 | 7/2016 | Li et al. | |
| 9,430,164 B1 | 8/2016 | Botelho et al. | |
| 2002/0156973 A1 | 10/2002 | Ulrich et al. | |
| 2008/0235489 A1 | 9/2008 | Gorobets | |
| 2008/0275847 A1 | 11/2008 | Chellapilla et al. | |
| 2010/0169287 A1 | 1/2010 | Klose | |
| 2010/0199027 A1 | 8/2010 | Pucheral et al. | |
| 2010/0276781 A1 | 11/2010 | Smith et al. | |
| 2010/0318587 A1 | 12/2010 | Seet et al. | |
| 2011/0107052 A1 | 5/2011 | Narayanasamy | |

(Continued)

OTHER PUBLICATIONS

Debnath, Biplob, et al. "ChunkStash: Speeding up Inline Storage Deduplication using Flash Memory," USENIX Annual Technical Confrerence, 2010. pp. 1-15.

(Continued)

*Primary Examiner* — Tuan A Pham
*Assistant Examiner* — Thai V Dang
(74) *Attorney, Agent, or Firm* — Womble Bond Dickinson (US) LLP (57) ABSTRACT

A method, article of manufacture, and apparatus for scaling an index on a solid state drive in a deduplicated storage system is discussed. The index may be scaled as index hash buckets approach capacity, or as new solid state drives are added to the system. The hash buckets may be mapped to HDD hash buckets, which are stored on a hard drive.

15 Claims, 9 Drawing Sheets

(56) References Cited

U.S. PATENT DOCUMENTS

| | | |
|---|---|---|
| 2011/0276744 A1 | 11/2011 | Sengupta et al. |
| 2011/0276780 A1 | 11/2011 | Sengupta et al. |
| 2011/0283082 A1* | 11/2011 | McKenney ......... G06F 12/1018 711/202 |
| 2011/0307447 A1 | 12/2011 | Sabaa et al. |
| 2011/0307659 A1 | 12/2011 | Hans et al. |
| 2012/0102248 A1 | 4/2012 | Tailliet |
| 2012/0124046 A1 | 5/2012 | Provenzano |
| 2012/0137059 A1 | 5/2012 | Yang et al. |
| 2012/0323860 A1 | 12/2012 | Yasa et al. |
| 2013/0036277 A1 | 2/2013 | Szcepkowski et al. |
| 2013/0042083 A1 | 2/2013 | Mutalik et al. |
| 2013/0073821 A1 | 3/2013 | Flynn et al. |
| 2013/0166820 A1 | 6/2013 | Batwara et al. |
| 2013/0275656 A1 | 10/2013 | Talagala et al. |
| 2013/0318051 A1 | 11/2013 | Kumar et al. |
| 2013/0318288 A1* | 11/2013 | Khan .................... G06F 3/0608 711/103 |
| 2014/0101113 A1 | 4/2014 | Zhang |
| 2014/0133237 A1 | 5/2014 | Sprouse et al. |
| 2014/0136759 A1 | 5/2014 | Sprouse et al. |
| 2014/0136760 A1 | 5/2014 | Sprouse et al. |
| 2014/0181041 A1 | 6/2014 | Whitehead et al. |
| 2014/0195720 A1 | 7/2014 | Akella et al. |
| 2014/0201385 A1 | 7/2014 | Rhea |
| 2014/0229790 A1 | 8/2014 | Goss |
| 2014/0304525 A1 | 10/2014 | Novak et al. |
| 2014/0310476 A1 | 10/2014 | Kruus et al. |
| 2014/0344234 A1 | 11/2014 | Amarendran et al. |
| 2014/0365449 A1 | 11/2014 | Chambliss et al. |
| 2014/0358871 A1 | 12/2014 | Cideciyan et al. |
| 2014/0379985 A1 | 12/2014 | Barber et al. |
| 2015/0127621 A1* | 5/2015 | Kuo ....................... G06F 3/061 707/692 |
| 2015/0277791 A1 | 10/2015 | Li et al. |
| 2016/0110120 A1 | 4/2016 | Pattabiraman et al. |
| 2016/0357477 A1* | 12/2016 | Nakajima ............. G06F 3/0641 |

OTHER PUBLICATIONS

Debnath, Biplob, et al., FlashStore: High Throughput Persistent Key-Value Store, Proceeding of the VLDB Endowment 3.1-2 (2010), pp. 1414-1425.

Meister, Dirk, et al. "Dedupv1: Improving Deduplication Througput Using Solid State Drives (SSD)," 2010 IEEE 26th Symposium on Mass Storage Systems and Technologies (MSST), (2010), pp. 1-6.

* cited by examiner

SCALING AN SSD INDEX ON A DEDUPLICATED STORAGE SYSTEM

CROSS REFERENCE TO RELATED APPLICATIONS

This application is related to co-pending U.S. patent application Ser. No. 14/586,165, filed Dec. 30, 2014, for SOLID STATE CACHE INDEX FOR A DEDUPLICATE STORAGE SYSTEM and U.S. patent application Ser. No. 14/586,184, filed Dec. 30, 2014 for A METHOD FOR LOCATING DATA ON A DEDUPLICATED STORAGE SYSTEM USING A SSD CACHE INDEX, filed concurrently herewith, which is incorporated herein by reference for all purposes.

FIELD OF THE INVENTION

This invention relates generally to deduplicated storage systems, and more particularly to systems and methods for scaling a SSD index on a deduplicated storage system.

BACKGROUND OF THE INVENTION

Deduplicated storage systems may contain data used during backup and recovery operations. For example, a client may backup its data to the deduplicated storage system. Similarly, the same client may attempt to recover its data from the deduplicated storage system. Recovery times may be at least partially based on how quickly the deduplicated storage system can locate the requested data.

There is a need, therefore, for an improved method, process, and system for quickly locating data on a deduplicated storage device.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

The present disclosure discusses systems, methods, and processes for building and maintaining an index for a deduplicated storage system on a solid-state drive ("SSD"). Data may be stored on the deduplicated storage system as segments packaged together into logical containers. These containers may be written to disk or other storage media in the deduplicated storage system. Occasionally, the segment may need to be read from the storage system. The index discussed herein allows the deduplicated storage system to quickly determine whether a segment already exists on the storage system, identify its logical container, and rapidly locate and read the segment from the storage media.

Figure 1:
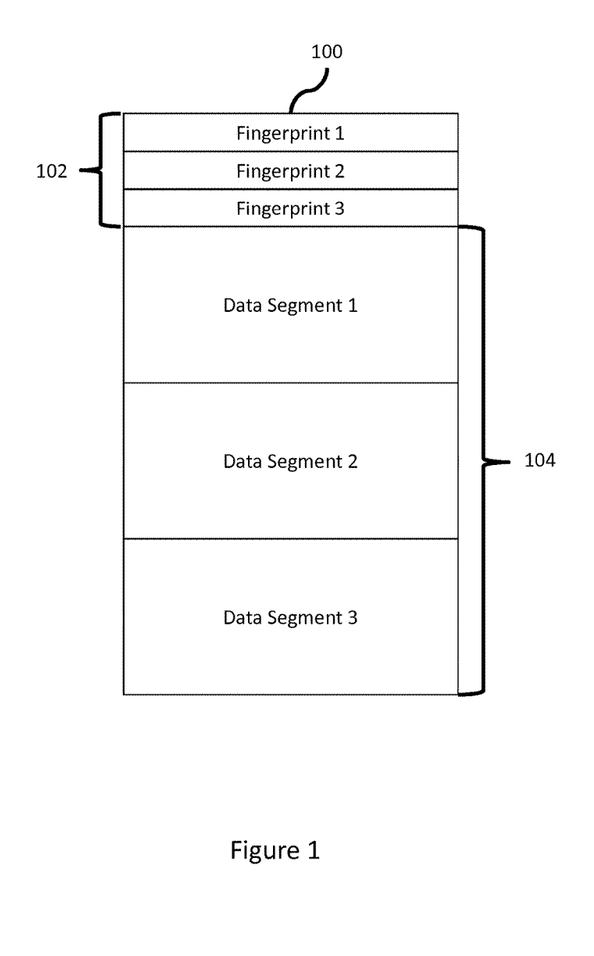
FIG. 1 depicts a logical container consistent with an embodiment of the present disclosure.

FIG. 1 depicts a logical container consistent with an embodiment of the present disclosure. Containers may be a logical entity or package containing one or more data segments and associated metadata. These containers may be passed around by different components of the deduplicated storage system for processing and may be written to a storage media. Container 100, for example, contains metadata section 102 and data section 104. Data section 104 contains three data segments comprising data to be stored on a deduplicated storage system. This data may have been received from an external system, for example as part of a backup process. Metadata section 102 includes three fingerprints associated with the data segments in data section 104. Processing each data segment using a hashing process may generate these fingerprints. As a result, each fingerprint may substantially uniquely identify each data segment. For example, processing Data Segment 1 using a hashing process may generate Fingerprint 1. In an embodiment, these containers are created by a software component residing in the deduplicated storage system as data is received from the external system.

As containers are processed by the deduplicated storage system they may be written to a storage media, such as a hard driver ("HDD"). To conserver resources, however, it may be desirable to ensure each data segment is only written to the storage media one time. Storing the segment more than once may waste storage resources and increase system cost. This may be particularly problematic in a backup system where received data only comprises minor changes. Determining whether a segment already exists on disk for every write, however, may be an inefficient use of processing resources. Scanning an entire volume for every received segment may drastically reduce system performance. Similarly, a data segment may occasionally need to be read from the storage medium, for example as part of a restore operation. Again, scanning the entire system to locate the segment may be an inefficient use of resources. The index discussed herein helps alleviate these concerns.

The index discussed herein comprises a data structure storing fingerprint/container associations. This allows the index to identify a container housing a data segment given that data segment's fingerprint. In an embodiment, the index is a hash table comprising one or more hash buckets. As containers are received, the metadata section is removed and each individual fingerprint is hashed to identify a hash bucket. A value comprising the fingerprint and a container identifier is then stored in the hash bucket, where the container identifier is a unique value identifying the container containing the fingerprint and it's associated data segment. Additionally, each bucket may contain multiple fingerprint/container identifier values.

For example, FIG. 1 depicts container 100 comprising metadata section 102. Container 100 may also have a unique container identifier. Metadata section 102 may be read, and Fingerprint 1, Fingerprint 2, and Fingerprint 3 may each be processed by the hashing process to identify one or more buckets. Once a bucket is identified for a given fingerprint, both the fingerprint and the container identifier may be stored in that bucket. For example, a value of {fp1, cid}, where fp1 is Fingerprint 1 and cid is container 100's container identifier, may be stored in the bucket identified by the hash of Fingerprint 1. If the hash of Fingerprint 2 and/or Fingerprint 3 identifies the same bucket as Fingerprint 1, their fingerprint/container identifier mappings may also be stored in the bucket. Alternatively, Fingerprint 2 and/or Fingerprint 3 hash to different buckets.

Given the above data structure, a container housing a given fingerprint and its associated data segment may be quickly identified using the index. A fingerprint may be received and hashed to identify the bucket that may contain the fingerprint/container identifier association. All the associations in the bucket may be iterated over, and the fingerprint values may be compared. If there is a match, the associated container identifier may be returned. If there is not a match, the fingerprint and its associated data segment may not exist on the deduplicated storage system. This process is discussed in detail below with reference for FIG. 8.

Figure 2:
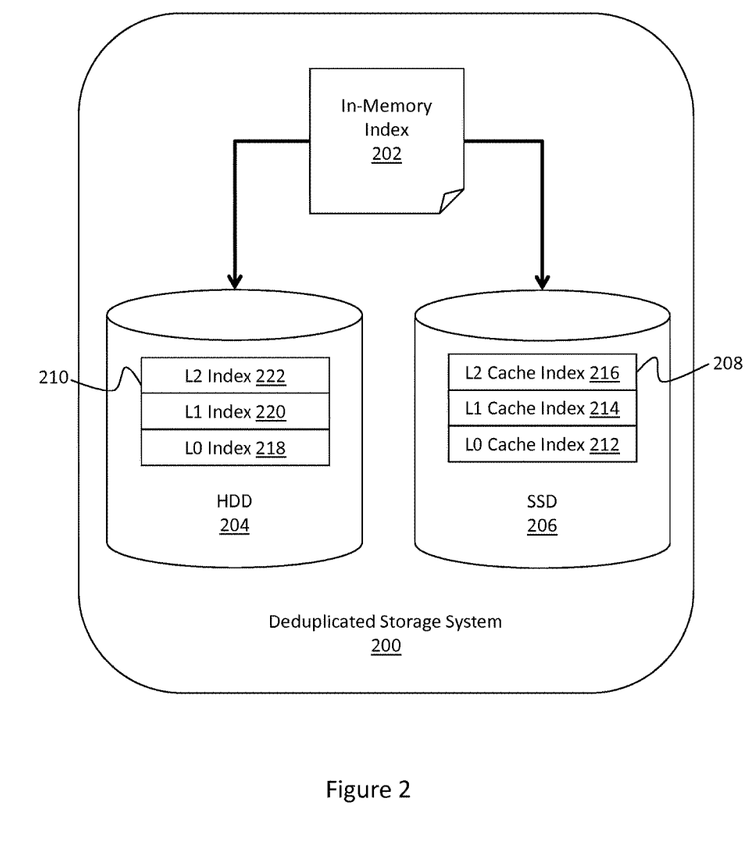
FIG. 2 depicts a deduplicated storage system including an index consistent with an embodiment of the present disclosure.

FIG. 2 depicts a deduplicated storage system comprising an index consistent with an embodiment of the present disclosure. While FIG. 2 depicts components of the system relevant to the index, the deduplicated storage system may include numerous additional components and modules. For example, the deduplicated storage system may include a component for creating and packaging the containers discussed in reference to FIG. 1, and may also include storage media for storing these containers. The following discussion addresses modules used to create and maintain the index.

Deduplicated storage system 200 may include in-memory index 202, hard drive 204, and solid-state drive 206. In some embodiments, in-memory index 202 may also be referred to as an in-memory hash table or a merge buffer. HDD 204 may comprise one or more disk drives. SSD 206 may comprise one or more solid-state storage devices.

As containers are received and/or processed by deduplicated storage system 200, their identifiers may be placed in in-memory index 202. In-memory index 202 may comprise an index substantially similar to that described above, and in an embodiment resides in the memory of the deduplicated storage system. Processing the containers and storing them initially in in-memory index 202 may allow the fingerprint/container identifier values to be quickly inserted into the appropriate hash bucket. Given memory capacity and persistence limitations, however, in-memory index 202 may need to be merged into persistent indexes at given time intervals or when a size threshold is reached. For example, in-memory index may be merged into HDD index 210 and/or cache index 206 for persistent storage.

Turning first HDD index 210, in-memory index 202 may be merged into an existing index residing on HDD 204. In an embodiment, the hash buckets of in-memory index 202 may map 1:1 to hash buckets on HDD index 210. For example, both in-memory index 202 and HDD index 210 may accommodate the same number of buckets. Merging the two indexes may comprise inserting the fingerprint/container identifier values into their corresponding hash buckets in HDD index 210.

In some embodiments, HDD index 210 may comprise different index levels, which in some embodiments are different index files stored on disk. These index levels could be, for example, L0 index 218, L1 index 220, and L2 index 222. In an embodiment, each index level may contain a portion of HDD index 210. For example, L0 index 218 may comprise the primary index file while L1 index 220 and L2 index 222 serve as buffers between in-memory index 202 and L0 index 218.

In an embodiment, when in-memory index 202 is merged into HDD index 204, it may first be merged into a higher-level index file. For example, the merge processes may read L1 index 220 from disk, and insert the fingerprint/container identifier values into the corresponding hash buckets in L1 index 220. Once the values are inserted, L1 index 220 may be written back to disk.

L1 index 220 may include a size threshold used to determine when to merge L1 index 220 with L0 index 218. For example, L1 index 220 may be limited to a certain size. Once that size is reached and/or exceeded, the fingerprint/container identifiers may be read from L1 index 220 and inserted into L0 index 218. After L1 index 220 is merged into L0 index 218, the entries may be removed from L1 index 220 and/or the file may be deleted.

In some embodiments, in-memory index 202 may need to be written to HDD index 210 while L1 index 220 is being merged with L0 index 218. In such an embodiment, in-memory index 202 may be written to L2 index 222. After the L1 index 220 is finished merging with L0 index 218, L2 index 222 may be designated the new L1 index 220. In some embodiments, designating the L2 index 222 as the L1 index 220 may comprise changing the file name of the index.

With reference now to SSD index 208, a similar merge process is discussed. In-memory index 202 may be merged into SSD cache index 208 before, during, or after merging into HDD index 210. In some embodiments, SSD cache index 208 may be similar to HDD 210. SSD cache index may include L0 cache index 212, L1 cache index 214, and L2 cache index 216 which may perform substantially similar to L0 index 218, L1 index 220, and L2 index 222, respectively. Storing the index on SSD 206 in addition to HDD 204 may significantly increase lookup times, as discussed in detail below.

In some embodiments, in-memory/HDD hash buckets and SSD hash buckets may not comprise a 1:1 mapping. Rather, the in-memory/HDD hash bucket to SSD hash bucket mapping may be 1:N. In other words, one HDD hash bucket may map to many SSD hash buckets. This difference could be due to resource or other constraints on the SSD. As a result, the HDD hash buckets and/or in-memory hash buckets may need to be mapped to specific SSD hash buckets during the merge process. This mapping is discussed in reference to FIG. 3.

Figure 3:
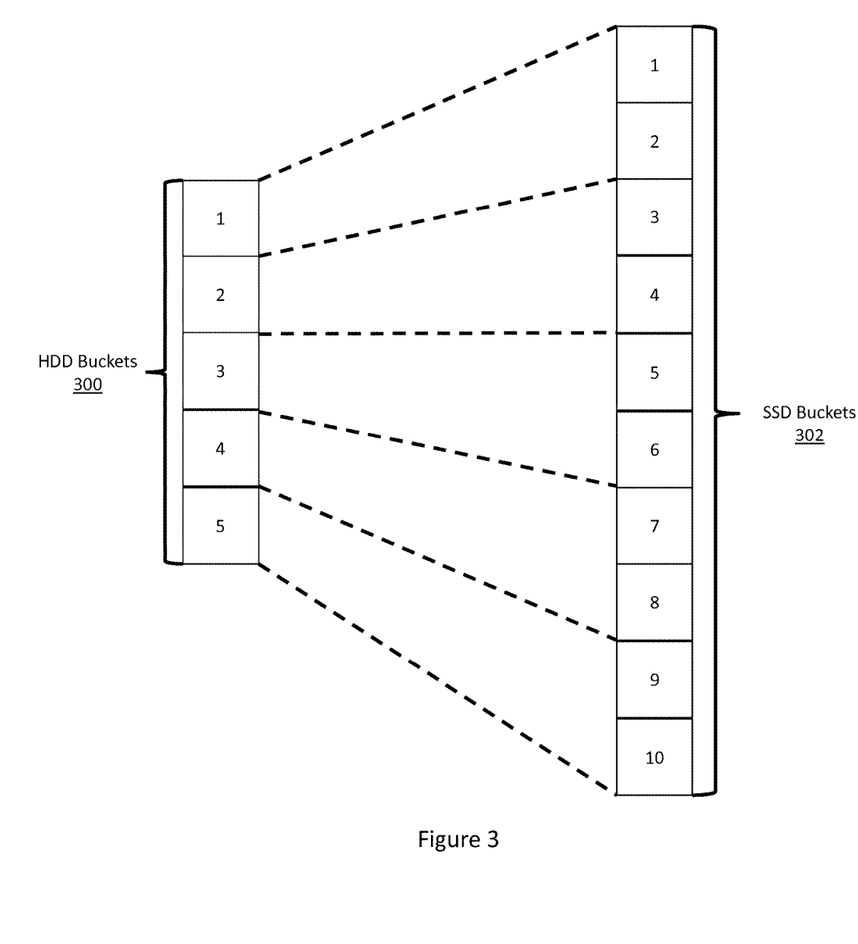
FIG. 3 depicts a HDD bucket to SSD bucket mapping consistent with an embodiment of the present disclosure.

FIG. 3 depicts a one-to-many HDD bucket to SSD bucket mapping. In some embodiments, an individual SSD bucket size may be limited to its page size. This could be, for example, 4K or 8 sectors. HDD buckets, however, may not have a similar size limitation. As individual SSD buckets approach capacity, the system may need to increase the number of buckets available to maintain the index. As a result, one HDD bucket may need to be mapped to multiple SSD buckets. For example, FIG. 3 depicts a system with five HDD buckets 300 mapped to ten SSD bucket 302. In an embodiment, increasing the number of SSD buckets may occur at the start of a merge process.

In an embodiment, the first time the index is created on an SSD the HDD bucket to SSD bucket mapping may be 1:1. The first time the index is created there may be a limited number of fingerprint/container identifiers entries, and therefore the SSD buckets may not initially be at capacity. At the start each subsequent merge, however, a check may be made to determine whether the SSD buckets will reach capacity as a result of the merge process. The check may occur when the in-memory index is merged with the SSD index, or when one of the constitute levels of the SSD index are merged with each other. For example, the check may occur when the L1 index is merged with the L0 index. If the SSD buckets are not at capacity, the entries may be merged into the existing buckets. If the SSD buckets are at capacity or some predetermined threshold (e.g. 90% capacity), the number of buckets may be increased and the entries may be inserted into the new buckets.

Scaling the number of available SSD buckets may comprise doubling the number of buckets on the SSD. For example, FIG. 3 depicts a 1:2 HDD to SSD bucket mapping. The next time the SSD buckets are scaled they may comprise a 1:4 mapping. This scaling process may continue until there is no available SSD space.

The number of buckets may be scaled until the SSD reaches capacity, at which point a new SSD device may need to be added to the system. For example, in the initial 1:1 mapping both the SSD and HDD indexes may comprise 64 million buckets. If each SSD bucket it 4K, than the initial SSD index size is 512 GB. If the deduplicated system has 2 TB of available SSD capacity, the index may be scaled twice, once to 1 TB and again to 2 TB, before more SSD capacity is needed to maintain the index.

In some embodiments the SSD index may not initially comprise a 1:1 mapping to HDD buckets. In the above example, the index may initially be scaled to 2 TB, or 256 million buckets. This may, however, result in a large number of empty buckets on the SSD. Writing these empty buckets to the SSD may cause unnecessary wear to the drive, which may be avoided by scaling the index only when the available buckets are approaching capacity.

Once the SSD index is appropriately scaled, the HDD buckets may be mapped to the SSD buckets for inserting fingerprint/container identifier values and/or locating fingerprint/container identifier values. In some embodiments, the buckets may be stored contiguously on the HDD and the SSD. As a result, a scaling factor and second hashing process may be used to identify the SSD buckets mapped to a given HDD bucket.

The formula for identifying the SSD bucket may be the following:

$$\text{ssd\_bucket\_id} = \text{hdd\_bucket\_id} * \text{scale\_factor} + \text{hash(fingerprint)} \% \text{ scale\_factor}. \quad \text{Formula 1:}$$

In an embodiment, hdd_bucket_id may be the HDD bucket. The scale_factor may be a numerical value identifying the number of SSD buckets for every HDD bucket. For example, if the SSD index is always doubled, the scaling factor will always be a power of two (2, 4, 8, 16, etc). Finally, hash(fingerprint) may comprise a second hash of the fingerprint. This second hash may be different from the first hash mapping the fingerprint to an HDD bucket. Once the appropriate SSD bucket is identified, it may be retrieved and processed appropriately.

After the HDD buckets are mapped to the SSD buckets, fingerprint/container identifier values may be entered into and/or read from the SSD buckets. For example, if the SSD index was scaled as part of a merge process the new entries may be inserted into the SSD buckets. In some embodiments, the SSD buckets contain a single word from the fingerprint rather than the entire fingerprint. For example, if the fingerprint is five bytes long the SSD bucket may only store one of the bytes (i.e. the byte is the word). Storing a single word from the fingerprint may reduce capacity requirements, thereby lowering the cost of the SSD index.

Figure 4:
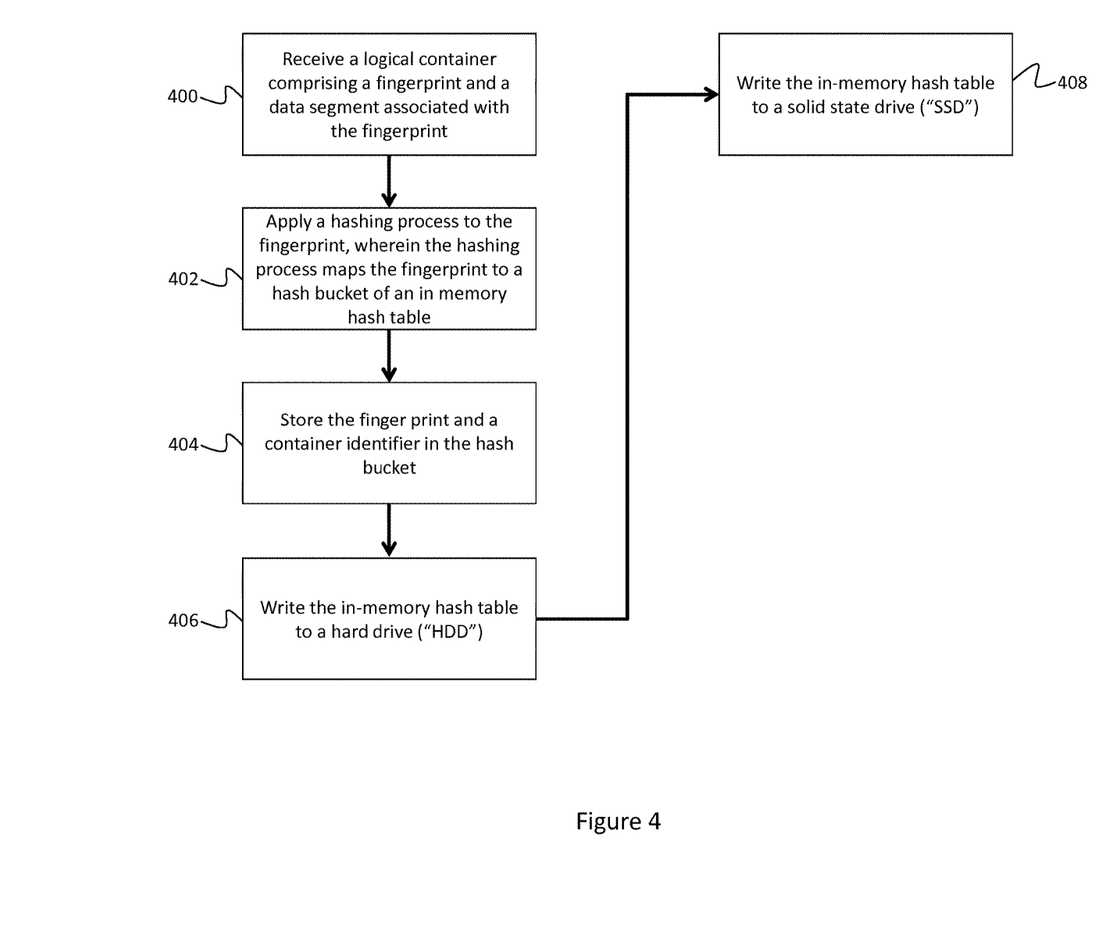
FIG. 4 depicts a process for building an index consistent with an embodiment of the present disclosure.

Turning now to FIG. 4, a process for building and maintaining an index on a SSD is discussed. At block 400, a logical container comprising a fingerprint and an associated data segment may be received. This logical container may be received from an external system, or it may be received from a separate software and/or hardware module operating in the deduplicated storage system. In some embodiments, the logical container may be substantially similar to container 100 depicted in reference to FIG. 1.

At 402, a hashing process may be applied to the fingerprint. This hashing process may map the fingerprint to a hash bucket in an in-memory hash table, such as in-memory index 202. In some embodiments the logical container may include multiple fingerprints and data segments and each of the fingerprints may be mapped to a hash bucket, which in some instances may be the same hash bucket.

At 404, the fingerprint and a container identifier may be stored in the hash bucket. For example, a fingerprint/container identifier association may be stored as a value in the hash bucket. In some embodiments the container identifier is a value uniquely identifying a logical container.

At block 406, the in-memory hash table may be written to a HDD. This HDD could be, for example, HDD 204. The in-memory hash table may be merged with an index already existing on the HDD, such as HDD index 210.

Finally, at block 408, the in-memory hash table may be written to a SSD. In some embodiments, writing the in-memory hash table to the SSD may comprise merging the in-memory hash table with an index that already exists on the SSD. This merge process may be substantially similar to that discussed above in reference to FIG. 2.

Figure 5:
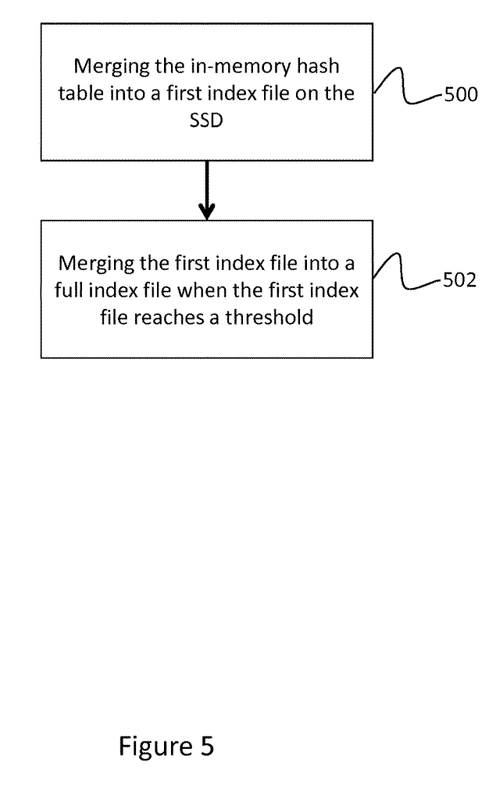
FIG. 5 depicts a process for merging hash files consistent with an embodiment of the present disclosure.

FIG. 5 depicts a process for merging the in-memory hash table with an SSD index consistent with an embodiment of this disclosure. In an embodiment, the SSD index may divided into multiple levels. For example, the SSD index may comprise an L0 cache index, L1 cache index, and L2 cache index as depicted in FIG. 2. These index levels may in the aggregate create the SSD index.

At block 500, for example, the in-memory hash table may be merged into a first index file on the SSD. This may be substantially similar to the merging process discussed in reference to FIG. 2 with respect to the HDD and the SSD. For example, in-memory hash table may be similar to in-memory index 202 and the first index file may be similar to L1 cache index 214. During the write process, L1 cache index may be read from the SSD and the fingerprint/container identifier values may be inserted into the cache index. The L1 cache index may then be written back to the SSD for persistent storage.

At block 502, the first index file may be merged into a full index file when the first index file reaches a threshold. For example, the full index file may be the L0 cache index depicted in FIG. 2. When the L1 cache index reaches a threshold, such as a file size or entry limit, the L1 cache index may be written into the L0 cache index file. If the in-memory hash table reaches capacity and needs to be flushed to persistent storage during the L1 or L0 merge, it may be written to L2 cache index until the merge is complete. The L2 cache index file may then be designated as the L1 cache index for future merges.

Figure 6:
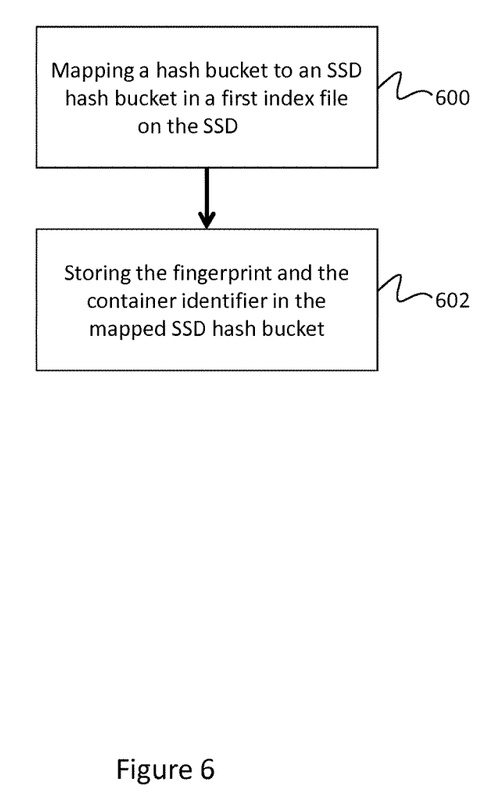
FIG. 6 depicts a HDD to SSD bucket mapping consistent with an embodiment of the present disclosure.

FIG. 6 depicts a process for mapping a hash bucket to a SSD hash bucket. This could be, for example, a result of scaling the index as discussed in reference to FIG. 3. In some embodiments, the hash bucket may be a HDD hash bucket. Additionally or alternatively, it may be a hash bucket from the in-memory index.

At block 600, the hash bucket may be mapped to the SSD hash bucket. Applying Formula 1 discussed above may provide this mapping. Once the SSD hash bucket is identified, the fingerprint and container identifier may be stored in the SSD hash bucket at 602.

Figure 7:
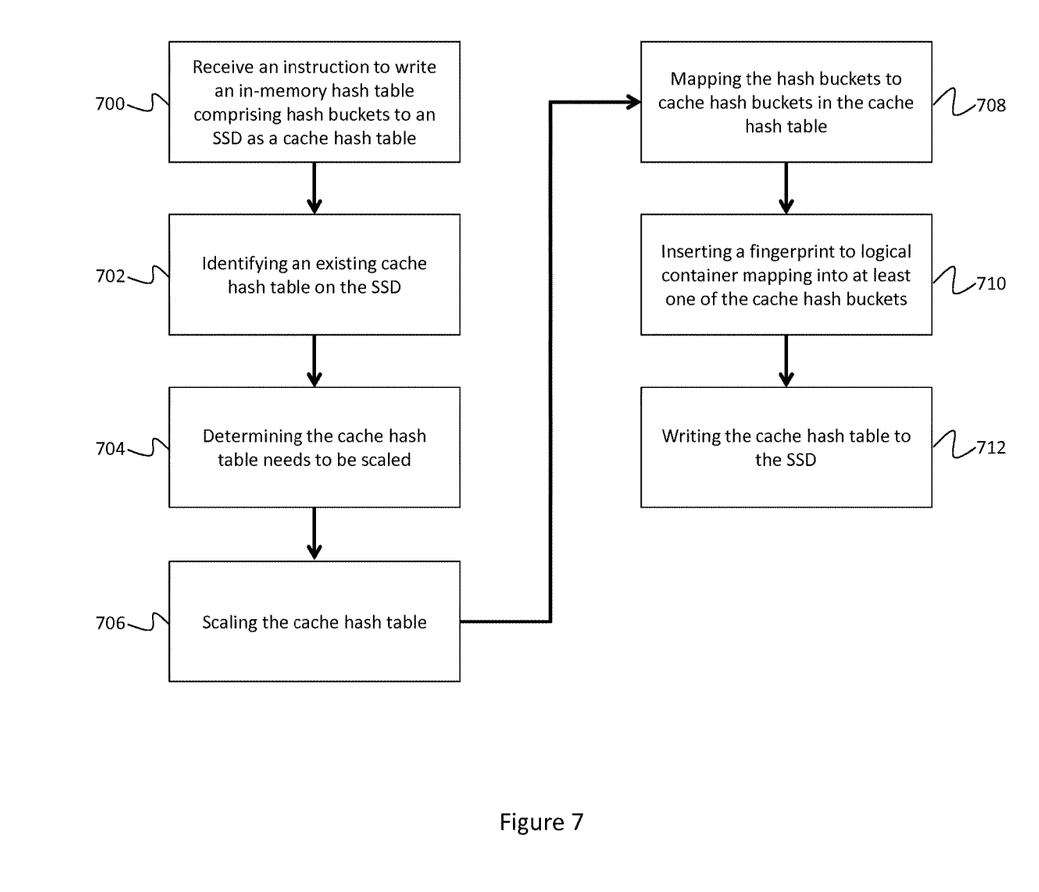
FIG. 7 depicts a process for scaling a hash cache consistent with an embodiment of the present disclosure.

FIG. 7 depicts a process for scaling the SSD index consistent with an embodiment of the present disclosure. This scaling process could be, for example, substantially similar to that discussed in reference to FIG. 3. At block 700, an instruction may be received to write an in-memory hash table to a SSD as a cache hash table. The in-memory hash table could be, for example, similar to in-memory index 202. The cache hash table may be similar to SSD cache index 208.

At 702, an existing cache hash table, such as cache hash index 208, may be identified on the SSD. This existing table could be the result of an earlier write, and may comprise a plurality of cache hash buckets.

At 704, the process may determine that the cache hash table needs to be scaled. For example, the buckets in the cache hash table may be reaching capacity. Additionally or alternatively, a new SSD device may have recently been added to the system and the cache hash may be scaled to accommodate the newly available space.

At 706, the cache hash table may be scaled. As discussed above, this scaling process may comprise doubling the number of buckets in the index. The scaling may be in response to the determination at 704 that the index needs to be scaled.

At 708, hash buckets from the in-memory hash table may be mapped to the cache hash buckets in the cache hash table. This mapping process may be substantially similar to the HDD to SSD bucket mapping discussed above. In some embodiments, the mapping may apply Formula 1 to determine the identity of the cache hash buckets corresponding to the hash buckets.

At 710, the fingerprint/container identifier mapping may be inserted into at least one of the cache hash buckets. For example, the fingerprint/container identifier mapping may be inserted into the cache hash bucket identified at block 708. In some embodiments, only one word from the fingerprint may be inserted into the cache hash bucket Finally, at 712, the cache hash table may be written to the SSD. This cache hash table and its corresponding entries may then be used to quickly identify container identifiers given a particular fingerprint, as discussed in reference to FIG. 8.

Figure 8:
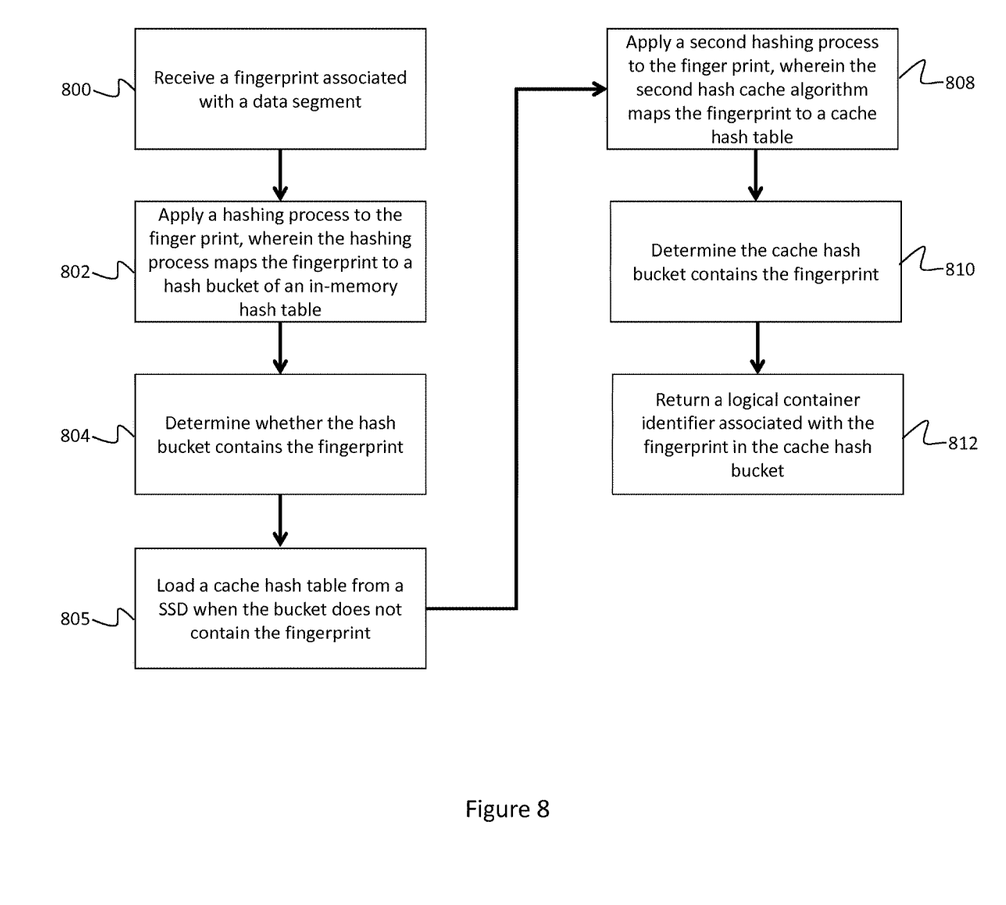
FIG. 8 depicts a process for performing a cache lookup consistent with an embodiment of the present disclosure.

Turning now to FIG. 8, a process for locating containers, container identifiers, and/or data segments using the SSD cache index is discussed. Locating container identifiers using the SSD cache index may be preferable to using the HDD cache index because SSD media may provide faster lookup times. Maintaining the index on the HDD in addition to the SSD may provide redundancy in case the SSD fails, becomes corrupt, or the lookup misses. FIG. 8 provides an example of this lookup process.

At block 800, a fingerprint associated with a data segment may be received. This fingerprint may be received from an external system, or from a separate software module within the deduplicated storage system. In some embodiments the fingerprint may be received as part of a restore process. A remote system may have a data backup residing on the deduplicated storage system, and the segment associated with the fingerprint may be part of that backup. The fingerprint may be provided to the index to locate the logical container containing that segment so it may be read to restore the remote system.

At block 802, a hashing process may be applied to the fingerprint. In an embodiment, this hashing process maps the fingerprint to a hash bucket in an in-memory hash table. This hash table could be, for example, substantially similar to in-memory index 202. It may be preferable to check the in-memory index for the a fingerprint match prior to checking the SSD cache index or the HDD index because the in-memory index may contain the fingerprint that has not yet been written to persistent storage. For example, the fingerprint/container identifier association may have recently been inserted into the in-memory index, and that index may not yet have been merged to the HDD or SSD.

At 804, the process determines whether the identified hash bucket contains the fingerprint. If the bucket contains multiple fingerprint/container identifier values, the process may iterate over all of the values and compare the fingerprints. If a match is found, the container identifier may be returned and the index lookup process may terminate. If no match is found, the process may continue to block 806.

At block 806 a cache hash table may be loaded from the SSD when the in-memory hash bucket does not contain the fingerprint. This cache hash table may be substantially similar to cache hash index 208. In some embodiments, loading the cache hash table comprises reading the cache hash table from the SSD. If the cache hash table comprises different files, such as L0 cache index and L1 cache index, each file may be loaded and processed individually. Additionally or alternatively, the index files may all be merged into one file, such as L0 cache index, and then the one file may be loaded for processing.

At block 808, a second hashing process may be applied to the fingerprint to identify a bucket in the cache hash table. For example, the second hashing process may be applied to the fingerprint as part of Formula 1. Additionally or alternatively, a scaling factor and/or the first hashing process may be used to identify the cache hash bucket. This process may be substantially similar for inserting the fingerprint/container identifier into the cache hash as discussed above.

At 810, a check may determine whether the cache hash bucket contains the fingerprint. For example, the process may iterate through all the entries in the cache hash bucket and compare the stored fingerprint with the received fingerprint. In some embodiments, the cache hash bucket may only contain one word of each fingerprint. If the fingerprint is five bytes long, for example, the bucket may only contain one of the bytes. The corresponding word from the received fingerprint may be compared to the stored word in the cache hash bucket. For example, if the system stores the second word from the fingerprint, the second word from the received fingerprint may be compared to the entries in the cache hash bucket.

If the determination at block 810 identifies a match, the associated container identifier may be returned at 812. Once the container identifier is returned the index lookup process may terminate.

If block 810 does not identify a fingerprint match, the SSD cache has experienced a miss. The process may continue to load the HDD index off a HDD and attempt to locate the fingerprint in that index. Keeping a full copy of the index on the HDD is therefore beneficial because it provides redundancy and allows the system to operate in the event of an error with the SSD cache index.

Figure 9:
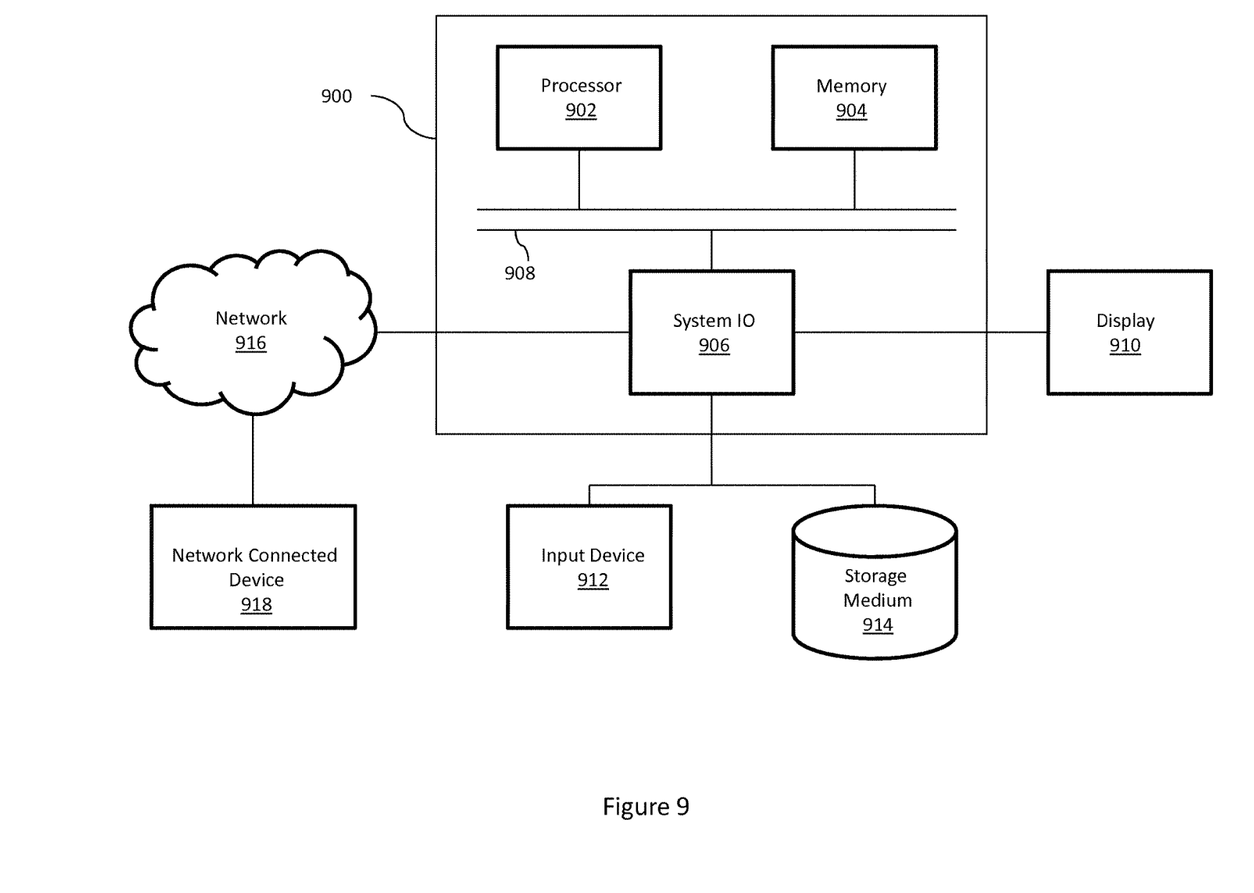
FIG. 9 depicts a general purpose computer system consistent with an embodiment of the present disclosure.

FIG. 9 depicts a computer system which may be used to implement different embodiments discussed herein. General-purpose computer 900 may include processor 902, memory 904, and system IO controller 906, all of which may be in communication over system bus 908. In an embodiment, processor 902 may be a central processing unit ("CPU") or accelerated processing unit ("APU"). Some embodiments may comprise multiple processors, or a processor with multiple cores. Processor 902 and memory 904 may together execute a computer process, such as the processes described herein.

System IO controller 906 may be in communication with display 910, input device 912, non-transitory computer readable storage medium 914, and/or network 916. Display 910 may be any computer display, such as a monitor, a smart phone screen, or wearable electronics and/or it may be an input device such as a touch screen. Input device 912 may be a keyboard, mouse, track-pad, camera, microphone, or the like, and storage medium 914 may comprise a hard drive, flash drive, solid state drive, magnetic tape, magnetic disk, optical disk, or any other computer readable and/or writable medium. Storage device 914 may also reside inside general purpose computer 900, rather than outside as shown in FIG. 1.

Network 916 may be any computer network, such as a local area network ("LAN"), wide area network ("WAN") such as the internet, a corporate intranet, a metropolitan area network ("MAN"), a storage area network ("SAN"), a cellular network, a personal area network (PAN), or any combination thereof. Further, network 916 may be either wired or wireless or any combination thereof, and may provide input to or receive output from IO controller 906. In an embodiment, network 916 may be in communication with one or more network connected devices 918, such as another general purpose computer, smart phone, PDA, storage device, tablet computer, or any other device capable of connecting to a network.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for scaling an index on a solid state drive ("SSD") in a deduplicated storage system, the method comprising:

receiving an instruction to write an in-memory hash table to the SSD, wherein the in-memory hash table comprises in-memory hash buckets containing a first set of fingerprint to logical container mappings, each mapping representing an association between a fingerprint and a logical container, wherein the logical container contains a data segment for the fingerprint;

merging the in-memory hash table with a cache hash table on the SSD, wherein the cache hash table comprises cache hash buckets containing a second set of fingerprint to logical container mappings, each cache hash bucket including a capacity limit, wherein the in-memory hash table is non-persistent, the merging further comprising:

determining that a combined capacity of the cache hash buckets in the cache hash table is to reach a predetermined threshold due to the merging of the in-memory hash table with the cache hash table;

determining that additional SSD capacity is available to the deduplicated storage system;

scaling the cache hash table using a scale factor to increase the number of cache hash buckets in the cache hash table;

mapping the in-memory hash buckets to the cache hash buckets in the cache hash table, wherein the mapping includes identifying a corresponding cache hash bucket for each in-memory hash bucket based on an identifier of the in-memory hash bucket, the scale factor, and a hash value for a fingerprint in the in-memory hash bucket, wherein the hash value is different from a hash value used to map the fingerprint to the in-memory hash bucket; and inserting a fingerprint to logical container mapping into at least one of the cache hash buckets mapped to the in-memory hash buckets; and writing the cache hash table to the SSD.

2. The method of claim 1, wherein the additional SSD capacity is a new solid state drive.

3. The method of claim 1, wherein determining the cache hash table needs to be scaled comprises determining at least one of the cache hash buckets has reached a maximum capacity.

4. The method of claim 3, wherein the maximum capacity is a SSD page size.

5. The method of claim 1, wherein scaling the cache hash table comprises doubling a number of cache hash buckets.

6. The method of claim 1, wherein mapping the in-memory hash bucket to the cache hash bucket comprises:
identifying a first hash used to identify an in-memory hash bucket in the in-memory hash buckets containing the fingerprint to the logical container mapping, wherein the first hash is a hash of the fingerprint; and
identifying a cache hash bucket in the cache hash buckets by rehashing the fingerprint.

7. The method of claim 1, wherein only one word of the fingerprint is stored in the at least one of the hash cache buckets.

8. A system for scaling an index on a solid state drive ("SSD") in a deduplicated storage system comprising a SSD, a memory, and a computer processor, the computer processor is configured to perform operations, the operations including:
receiving an instruction to write an in-memory hash table to the SSD, wherein the in-memory hash table comprises in-memory hash buckets containing a first set of fingerprint to logical container mappings, each mapping representing an association between a fingerprint and a logical container, wherein the logical container contains a data segment for the fingerprint;
merging the in-memory hash table with a cache hash table on the SSD, wherein the cache hash table comprises cache hash buckets containing a second set of fingerprint to logical container mappings, each cache hash bucket including a capacity limit, wherein the in-memory hash table is non-persistent, the merging further comprising:
determining that a combined capacity of the cache hash buckets in the cache hash table is to reach a predetermined threshold due to the merging of the in-memory hash table with the cache hash table;
determining that additional SSD capacity is available to the deduplicated storage system;
scaling the cache hash table using a scale factor to increase the number of cache hash buckets in the cache hash table;
mapping the in-memory hash buckets to the cache hash buckets in the cache hash table, wherein the mapping includes identifying a corresponding cache hash bucket for each in-memory hash bucket based on an identifier of the in-memory hash bucket, the scale factor, and a hash value for a fingerprint in the in-memory hash bucket, wherein the hash value is different from a hash value used to map the fingerprint to the in-memory hash bucket; and
inserting a fingerprint to logical container mapping into at least one of the cache hash buckets mapped to the in-memory hash buckets; and
writing the cache hash table to the SSD.

9. The system of claim 8, wherein the additional SSD capacity is a new solid state drive.

10. The system of claim 8, wherein determining the cache hash table needs to be scaled comprises determining at least one of the cache hash buckets has reached a maximum capacity.

11. A computer program product for scaling an index on a solid state drive ("SSD") in a deduplicated storage system, the computer program product comprising a non-transitory computer readable medium encoded with computer executable program, the code enabling:
receiving an instruction to write an in-memory hash table to the SSD, wherein the in-memory hash table comprises in-memory hash buckets containing a first set of fingerprint to logical container mappings, each mapping representing an association between a fingerprint and a logical container, wherein the logical container contains a data segment for the fingerprint;
merging the in-memory hash table with a cache hash table on the SSD, wherein the cache hash table comprises cache hash buckets containing a second set of fingerprint to logical container mappings, each cache hash bucket including a capacity limit, wherein the in-memory hash table is non-persistent, the merging further comprising:
determining that a combined capacity of the cache hash buckets in the cache hash table is to reach a predetermined threshold due to the merging of the in-memory hash table with the cache hash table;
determining that additional SSD capacity is available to the deduplicated storage system;
scaling the cache hash table using a scale factor to increase the number of cache hash buckets in the cache hash table;
mapping the in-memory hash buckets to the cache hash buckets in the cache hash table, wherein the mapping includes identifying a corresponding cache hash bucket for each in-memory hash bucket based on an identifier of the in-memory hash bucket, the scale factor, and a hash value for a fingerprint in the in-memory hash bucket, wherein the hash value is different from a hash value used to map the fingerprint to the in-memory hash bucket; and
inserting a fingerprint to logical container mapping into at least one of the cache hash buckets mapped to the in-memory hash buckets; and
writing the cache hash table to the SSD.

12. The computer program product of claim 11, wherein the additional SSD capacity is a new solid state drive.

13. The computer program product of claim 11, wherein determining the cache hash table needs to be scaled comprises determining at least one of the cache hash buckets has reached a maximum capacity.

14. The method of claim 1, wherein in-memory hash table merges with SSD hash table so that in-memory hash buckets and cache hash buckets are continuous.

15. The method of claim 14, wherein a scale factor and a second hashing process is used to identify fingerprint to the cache hash buckets.

\* \* \* \* \*